United States Patent [19]
Konstance

[11] Patent Number: 5,368,871
[45] Date of Patent: Nov. 29, 1994

[54] SEAFOOD ANALOGS FROM CASEINATE AND PROCESS OF MAKING SAME

[75] Inventor: Richard P. Konstance, Philadelphia, Pa.

[73] Assignee: The United States of America as represented by the Secretary of Agriculture, Washington, D.C.

[21] Appl. No.: 2,342

[22] Filed: Jan. 6, 1993

[51] Int. Cl.$^5$ .............................. A23L 1/0562
[52] U.S. Cl. ..................... 426/104; 426/516; 426/573; 426/574; 426/657; 426/802
[58] Field of Search .............. 426/656, 637, 104, 573, 426/580, 802, 515, 516, 522, 574

[56] References Cited

U.S. PATENT DOCUMENTS

| | | | |
|---|---|---|---|
| 2,813,794 | 11/1957 | Anson et al. | 99/20 |
| 3,996,390 | 12/1976 | Igoe | 426/573 |
| 4,080,477 | 3/1978 | Tsumura et al. | 426/656 |
| 4,209,534 | 6/1980 | Poznanski et al. | 426/42 |
| 4,250,198 | 2/1981 | Miller et al. | 426/335 |
| 4,328,252 | 5/1982 | Murray et al. | 426/656 |
| 4,338,340 | 7/1982 | Morimoto et al. | 426/574 |
| 4,364,966 | 12/1982 | Chang | 426/583 |
| 4,562,082 | 12/1985 | Morimoto | 426/574 |
| 4,579,741 | 4/1986 | Hanson et al. | 426/802 |
| 4,588,601 | 5/1986 | Maruyama et al. | 426/574 |
| 4,883,683 | 11/1989 | Sano et al. | 426/582 |
| 4,994,366 | 2/1991 | Wu | 426/574 |

*Primary Examiner*—Donald E. Czaja
*Assistant Examiner*—Anthony Weier
*Attorney, Agent, or Firm*—M. Howard Silverstein; John D. Fado; Joseph A. Lipovsky

[57] ABSTRACT

A formulation and process is provided for the production of firm, irreversible protein-containing elastic gels which can be used in the production of food analogs including kamaboko or seafood analogs. In this process a mixture of calcium caseinate, sodium hexametaphosphate, and either a carrageenan or a combination of lactalbumin and egg albumin, are blended in an aqueous mixture to form a homogeneous blend. The blend, upon heating to form a uniformly viscous solution, is subsequently cooled to form an edible gel.

10 Claims, 3 Drawing Sheets

SEAFOOD ANALOGS FROM CASEINATE AND PROCESS OF MAKING SAME

BACKGROUND OF THE INVENTION

1. Field of the Invention

The present invention relates to the production of caseinate-based seafood analogs. More particularly, the invention is directed to formulations and processes for producing non-textured kamaboko analogs; or with texturization, imitation products of crab, shrimp or lobster.

2. Description of the Prior Art

Seafood analogs represent a rapidly growing market segment of the food industry. Surimi, a minced fish product produced primarily from Alaska Pollock, has the unique textural and functional properties requisite for these analogs. Kamaboko, frequently referred to as steamed fishcake, is a typical Japanese seafood which has its origins in the tenth century where it was developed as a means of preserving the gelling properties of washed, minced fish. While many fish species have in the past been used for its production, the primary source in the domestic production of kamaboko today is Alaska Pollock, due to both its ready availability and acceptable gelling properties.

Kamaboko is a homogenous protein gel made from fish myoftbrilla protein. This product, which is primarily actomyosin, is produced by the removal of water soluble proteins through washing, solubilization of the actomyosin with sodium chloride, and heating. The Japanese term "ASHI" refers to the unique cohesive and highly elastic texture which is characteristic of kamaboko.

Milk proteins are highly desirable as ingredients in foods. In addition to their availability and high nutritive value, their utilities as food bases are enhanced by the bland products they provide. Casein, the major protein component of cow's milk, and its caseinate derivatives have physicochemical, functional and nutritive properties which make them useful for such purposes. Products containing high concentrations of caseinate have exceptional water-binding capacity, fat emulsification properties, whipping ability, and are viscous and soluble under neutral or alkaline conditions. These proteins are currently used in a variety of products, including coffee whiteners, cheese analogs and meat products.

The emphasis on the production of fabricated foods has increased the demand for highly purified food grade proteins, commonly referred to as functional proteins, of which milk proteins serve as one of the most important sources.

Milk proteins are known to gel when subjected to acid treatment, heat treatment, aging, or rennet treatment. Casein is the component involved in each of these gels. The most prominent example of the rennet-induced caseinate gels is in the manufacture of most cheese varieties. Gels have been obtained from calcium caseinate (CaCN) dispersions at concentrations greater than 15% when heated to 50° C. to 60° C. These gels, however, have the disadvantage of being reversible and liquefy slowly on cooling.

The utilization of caseins and caseinate for their properties of gelation has thus far been limited to their use as binding, thickening or emulsifying additives to some other food component. Prior uses for casein as a solid viscoelastic "stand alone" gel are primarily limited to cheeses and yogurts.

Gels have also been obtained from skim milk curd by the addition of $CaCl_2$ with subsequent autoclaving. The resultant gels contained 30 to 40% solids primarily in the form of protein. These products were considered to have a structure that was too close and homogenous to simulate the structure of meat.

It is known that the structure of caseinate gels can be altered significantly with the use of polysaccharide additives. Inclusion of potato starch is known to be effective for increasing the rigidity of surimi gels; this being due to its high water absorption characteristics. Carrageenans have been used extensively in a wide range of food systems as thickening, suspending and gelling agents and are frequently added to dairy products, such as ice cream, custards or chocolate milk to improve viscosity. Moderately high concentrations of κ-carrageenan cause casein to gel.

U.S. Pat. No. 4,209,534 discloses a method for producing a thermally stable textured milk protein product resembling beef. In the process, whole partially skim or skim milk is subjected to pasteurization at a temperature of 72°–92° C. for 15–30 seconds with the addition of one or more calcium salts. Five percent to 25% by volume of the milk to be processed is cooled to a temperature of 40°–70° C. and mixed with animal or vegetable fats and then homogenized. The homogenized mixture is then combined with the remaining portion of the milk, which can then be processed by the addition of acids such as phosphoric acid. A pulp is formed by enzymatic coagulation of the casein and milk albumins, disintegration and reducing the water content of the coagulate to 70%–80% by weight. Preliminary texturization of the granulated pulp is carried out by thermal plasticization at 60°–80° C. in an acidified aqueous solution. Principal texturization is done at 40°–60° C. by squeezing the pulp in a screw extruding press, disintegrating the obtained textured milk proteins into pieces of various sizes and conditioning these pieces at 14°–20° C. Subsequent freezing and lyophilization steps restore the finished textured milk protein. In this process, polyphosphate, carrageens and pectins can be added to the pulp after the preliminary texturing.

U.S. Pat. No. 3,996,390 discloses a system for the preparation of an acidified milk gel. The composition comprises a thickener system of carboxymethyl cellulose and gelatin.

U.S. Pat. No. 2,813,794 discloses a process for preparing a chewy casein gel for use in protein food products simulating meat. This process comprises forming an aqueous solution of casein at a pH of about 1.8 which is then heated to a temperature above 70° C. whereupon a water-soluble calcium salt is added thereto to give a calcium ion concentration of about 0.1 normal. The pH is then adjusted to 6, with the resultant gel precursor being collected and the gel is then being heated with saturated steam at 15 psi for 15 minutes.

U.S. Pat. No. 4,080,477 discloses the creation of a soy-containing cheese-like product by adding both a casein-containing substance derived from animal milk and an emulsifying salt to natural soy cheese and agitating the mixture under relative high sheer conditions. The process is carried out at an elevated temperature not exceeding 85° C. for a period of time sufficient to form the mixture into a softened, full bulk consistency.

U.S. Pat. No. 4,883,683 discloses a method for the preparation of solid foodstuffs comprising reacting an alkaline earth metal-type solidifying agent with an aqueous emulsion comprising soybean protein, a casein, oils and fats. The mixing and emulsification of products produced lacked coarseness or dryness but have excellent melt in the mouth properties.

U.S. Pat. No. 4,250,198 discloses a meat snack analog made from non-meat protein material, fat, water, spices, coloring and flavoring. This material includes a protein binder such as sodium caseinate and powered egg white.

It is an object of the present invention to provide a formulation and process for the preparation of food analogs including seafood analogs from milk proteins. A further object of the present invention is to provide a method for the preparation of a milk-based protein product having the texture of a seafood analog such as imitation crab, shrimp or lobster.

SUMMARY OF THE INVENTION

It has been unexpectedly discovered that seafood analogs can be produced from caseinates derived from milk protein. According to the present invention, a firm, irreversible protein-containing elastic gel resembling surimi can be produced by blending to homogeneity an aqueous mixture comprising from about 25% to about 40% by weight of a caseinate, preferably calcium caseinate, from about 1% to about 10% by weight of sodium hexametaphosphate, and either from about 1% to about 4% by weight of a carrageenan or the combination of lactalbumin in an amount from about 5% to about 15% by weight and egg albumin in an amount ranging from about 5% to about 15% by weight. Ancillary ingredients such as coloring agents and flavorants may additionally be added. Preferably, the mixture is blended to homogeneity with water in the form of ice. In a preferred embodiment, sufficient water is blended with the mixture to form a gelled product having a water content ranging from about 55% to about 65% by weight. A gelled product serving as a kamaboko analog can be produced from the surimi-like product by heat treatment at a temperature ranging from about 70°0 C. to about 90° C., preferably about 80° C. to about 85° C. for a period of time sufficient to form a uniformly viscous solution, preferably about 30 to about 60 minutes and most preferably about 40 to about 45 minutes, and then cooling preferably in a mold, to a temperature preferably ranging from about 3° C. to about 5° C. to form a gel.

According to the present invention, the blending of the mixture is carried out under high shear conditions (about 1600 to about 2000 rpm). Preferably, a high-speed blender is used. In the present process, the ice can be added to the other ingredients before or after mixing begins, with it being preferable that the blending is carried out by mixing the ice with the other ingredients before blending at high shear levels. Further, it is preferable that the calcium caseinate is added to the mixture in a powdered form.

In a preferred embodiment, a conventional foaming agent or gas forming techniques such as fermentation may be used in production of the seafood analogs in order to produce a product possessing an open structure and improved elasticity.

In a preferred embodiment, water in the form of ice is mixed under high shear conditions with about 35% by weight of calcium caseinate, about 5% by weight of sodium hexametaphosphate, and about 1% to about 4% by weight of a carrageenan. This mixture is then preferably heated to about 80° C. for one hour followed by rapid cooling to about 3° C. to about 5° C. to produce a gelled material that closely approximates the textural properties of kamaboko, a surimi product. This formulation and process have additional utility when further texturized by an extrusion process that allows for the creation of seafood analogs, such as imitation shrimp, crab and lobster. The extrusion can be carried out by any of the conventional thermal mechanical extrusion processes known to effect texturization.

The products of the present invention are advantageous in that due to their being based on casein, they are not readily susceptible to degradation in storage. Further, the use of casein and caseinate for this purpose presents an important development in the utilization of milk and milk components which helps expand existing markets and create new markets for the dairy industry.

The caseinate gels produced according to the present invention exhibit a marked improvement over prior art gel analogs in water holding capacity, (syneresis). Gel characteristics of elasticity and firmness can be controlled through manipulation of the formulation in order to produce products that closely mimic kamaboko and other seafood analogs. While the gels of the instant invention are envisioned primarily for use as seafood analogs, they may alternatively be used in the confectionery arts as candy fillings.

DETAILED DESCRIPTION

Figure 1:
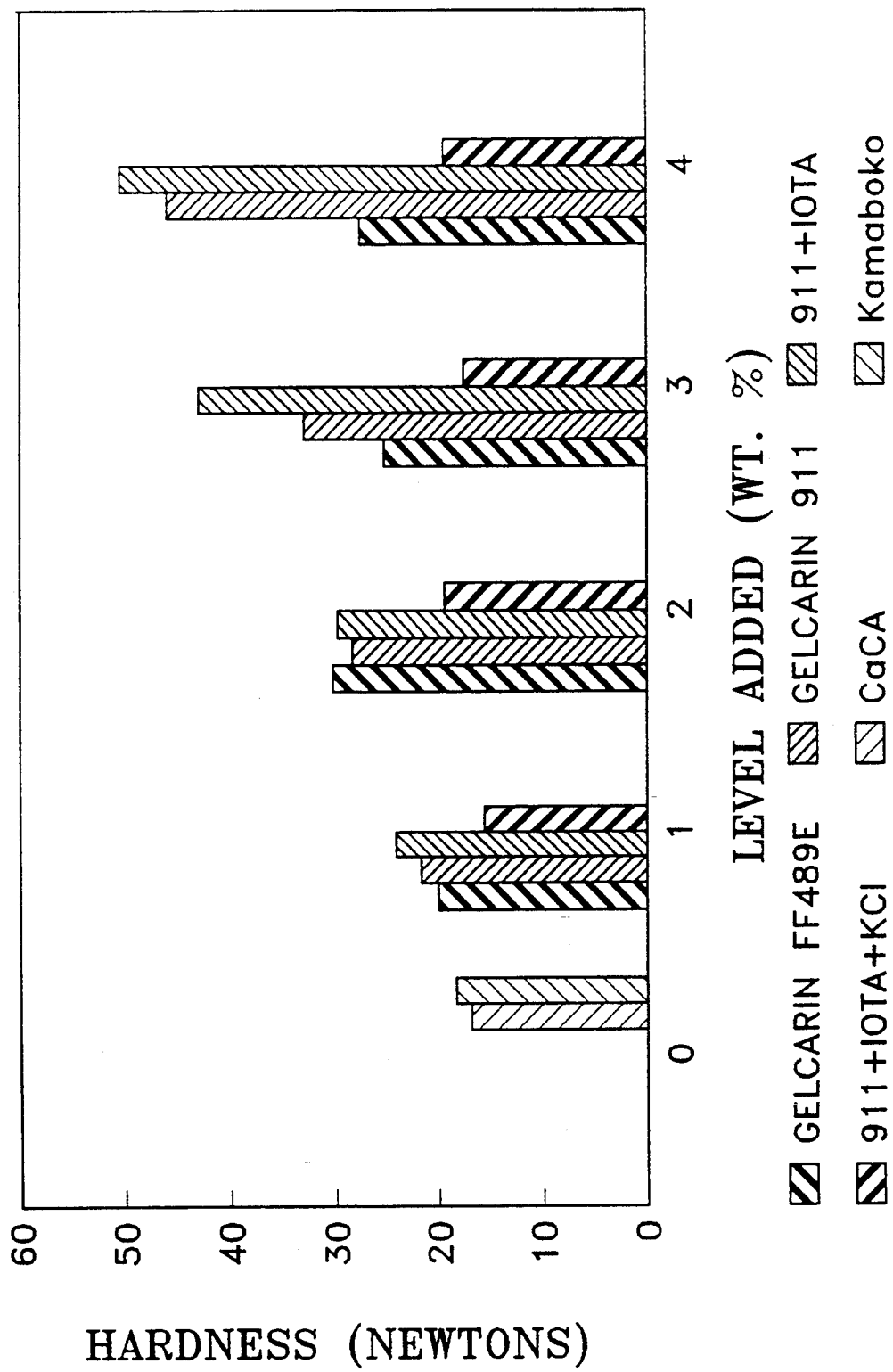
FIG. 1 is a bar graph comparing the hardness of various gels with kamaboko.

The method according to the invention is described hereinafter in detail by way of examples with reference to the accompanying drawings comparing the various prepared gels with kamaboko but is to be viewed as exemplary and not limiting the scope of the invention.

EXAMPLE 1

Commercial (New Zealand Milk Products, Inc.) calcium caseinate (CaCN) (Alanate 310 - 89.8% protein, 4.1% ash, 4.5% water, 1.1% fat and 0.1% lactose) was used to prepare all gels. The carrageenans used, Gelcarin FF489E κ-carrageenan (formulation includes potassium carbonate, sodium carbonate and calcium sulfate), Gelcarin 911 κ-carrageenan (formulation includes dextrin) and Gelcarin GZP359 κ-carrageenan, were obtained from FMC (Philadelphia, Pa.). Unmodified, food grade potato and wheat starch were obtained from AVEBE America Inc. and Manildra Milling Corp., respectively. Phosphate was added to all non-control samples at 0.5% (by weight) level using FMC Class H sodium hexametaphosphate. Kamaboko loaves (Hana Brand, Rhea Bros., Inc., Columbia, Md.), used were "Itatsuki" a variety of Alaskan Pollock.

Specific solids contents (25, 35, and 45% by weight) were used for all formulations. The use of various additives was compensated for by reducing the amount of calcium caseinate in the formulation. Calcium caseinate dispersions were prepared by mixing the protein powder and the various additives with crushed ice. The mixing method, used to provide for rapid and uniform dispersion, utilized a Cuisinart food processor (750 ml bowl capacity) equipped with a stainless steel blade rotating at 1790 rpm. All samples were mixed for ten minutes. Samples were removed from the food processor and spooned into twirl bags which were then compacted before sealing. The samples were then placed in a 90° C. water bath for one hour to create a uniformly viscous solution, after which they were removed from the bath and allowed to gel under refrigerated conditions. Samples were stored in a refrigerator for 12 to 48 hours before rheological analysis.

EXAMPLE 2

Sample gels, in loaf form, were removed from the bags produced in Example 1 and sliced to the desired height (15 mm) using a parallel wire slicer. Cylindrical samples were extracted from the slices using a 15 mm #11 cork borer. To minimize deformation during slicing and extraction, all samples were maintained at 4° C. Four samples were extracted from each gel. Length to diameter ratios, (L/D>0.95), were used for all analyses. Samples were rejected when major flaws were detected (air pockets on surface) or when deviation from upright cylinder geometry was observed.

Rheological Analysis

Instrumental Texture Profile Analyses (ITPA, double compression) were used to determine rheological responses, using a model 4201 Instron Universal Testing Machine (UTM), Canton, Mass., with 5.6 cm lucite plates. Each formulation was sampled in quadruplicate and statistically evaluated. Coefficients of variation (CV) for all replicate runs were established. The average CV for replicates for all parameters evaluated was 5.39% with chewiness exhibiting the highest CV at 9.23%. INSTRON control was maintained using Series XII Cyclic Test application program. A 500N load cell was used for all analyses and samples were compressed to 50% of their original height at a rate of 50 mm/min. All samples were tested at 25° C. Stress-strain data was derived from the force deformation data (INSTRON output) using art-accepted equation as disclosed by Patel et al. "Effect of Test Conditions on Instrumental Texture Parameters of Kalakand"; *Int. Dairy Journal* 2 (1992) 143–156; herein incorporated by reference.

Water binding capacity (syneresis) was determined by subjecting a 5 mm slice of the gel to a 500 g static force for approximately 30 minutes. Syneresis is presented as the ratio of the amount of water expressed to the total weight of the sample. The fold test, used in evaluating surimi products evaluates the resilience of the gel by observing the tendency for cracking of 5 mm gel slices folded twice. Scoring is as follows: AA-double fold—no crack, A-single fold—no crack, B-single fold—partial crack, C-single fold—total break.

Calcium caseinate gels, with 0.5% by weight added phosphate and without added phosphate, were analyzed as control samples at solids contents of 25, 35 and 45% by weight. Table 1 shows the results of the rheological analysis of these samples. In addition to the texture profile parameters of hardness and cohesiveness, data for the sample elasticity and water binding capacity (syneresis) are presented. Data for these parameters of hardness is also presented for the target material, kamaboko. Both hardness and elasticity of the caseinate gels increased with increased solids content and the addition of phosphate, whereas cohesiveness appeared to be dependent only on the added phosphate. Syneresis improved significantly at caseinate concentrations above 25%. Comparison to the kamaboko target material shows that hardness, cohesiveness and water binding can be duplicated with the caseinate gel with added phosphate at 35% and 45% solids. The elasticity of the gels with added phosphate and at a solids content above 25% showed a significant increase, but were not as elastic as the kamaboko gels. With this information in hand, all subsequent evaluations with the polysaccharide additives were accomplished using a 35% solids concentration with 0.5% added phosphate. Adjustments were made to the caseinate content of the gels to allow this concentration of solids to be maintained.

TABLE 1

Texture Parameters of Calcium Caseinate Gels at Various Solids Concentrations

| Solids % | Without Phosphate | | | | With Phosphate | | | |
|---|---|---|---|---|---|---|---|---|
| | Hardness N | Elasticity | Cohesiveness | Syneresis g/g | Hardness N | Elasticity | Cohesiveness | Syneresis g/g |
| 25 | $7.67^a$ | $0.413^d$ | $0.655^g$ | $7.70^j$ | $13.24^l$ | $0.456^e$ | $0.680^g$ | $6.80^j$ |
| 35 | $10.18^b$ | $0.42^d$ | $0.661^g$ | $1.01^k$ | $17.10^c$ | $0.574^n$ | $0.732^h$ | $1.01^k$ |
| 45 | $20.34^c$ | $0.472^e$ | $0.659^g$ | $0.91^k$ | $29.13^m$ | $0.576^n$ | $0.699^g$ | $1.19^k$ |
| Kamaboko | $18.53^c$ | $0.795^f$ | $0.752^h$ | $1.99^j$ | $18.53^c$ | $0.795^f$ | $0.752^h$ | $1.99^j$ |

Statistically evaluated by ANOVA. Superscripts that are the same within a parameter category indicate no significant difference (P < 0.05)

EXAMPLE 3

Since starch granules imbibe water, they swell and fill intersticial spaces of the gel network, thus adding to its rigidity. Since modified starches have better granule structure, they were used in the caseinate formulations. The greater the water binding capacity and viscosity of the starch, the greater its gel strengthening effect. Both potato and wheat starch are considered advantageous in creating strong and elastic gels and were added at 2.5% and 5% levels. The evaluation of the textural parameters of caseinate gels made with added starch are shown in Table 2 and are compared to both kamaboko and the control sample.

TABLE 2

Texture Parameters of Calcium Caseinate Gels with Phosphate. Effect of Starches

| | Hardness N | Cohesiveness | Gumminess N | Elasticity | Springiness mm | Chewiness N-mm | Adhesion N | RE |
|---|---|---|---|---|---|---|---|---|
| Control 2.5% Starch | $17.10^a$ | $0.73^c$ | $12.53^e$ | $0.57^g$ | $5.97^j$ | $74.41^n$ | $0.18^o$ | $0.48^u$ |
| Potato | $12.49^a$ | $0.68^b$ | $8.47^d$ | $0.52^g$ | $5.51^j$ | $46.45^m$ | $0.25^o$ | $0.38^s$ |
| Wheat | $17.70^a$ | $0.72^{b,c}$ | $12.72^e$ | $0.59^g$ | $5.62^j$ | $55.01^m$ | $0.29^o$ | $0.45^t$ |

TABLE 2-continued

| | Texture Parameters of Calcium Caseinate Gels with Phosphate. Effect of Starches | | | | | | | |
|---|---|---|---|---|---|---|---|---|
| | Hardness N | Cohesiveness | Gumminess N | Elasticity | Springiness mm | Chewiness N-mm | Adhesion N | RE |
| 5% Starch | | | | | | | | |
| Potato | $15.91^a$ | $0.65^b$ | $10.28^{d,e}$ | $0.50^f$ | $4.82^i$ | $49.41^m$ | $0.34^o$ | $0.37^s$ |
| Wheat | $15.59^a$ | $0.70^b$ | $10.85^{d,e}$ | $0.54^g$ | $5.55^j$ | $59.39^m$ | $0.39^p$ | $0.38^s$ |
| Kamaboko | $18.53^a$ | $0.75^c$ | $11.05^e$ | $0.80^h$ | $6.77^k$ | $74.80^n$ | $0.10^r$ | $0.66^v$ |

Control Sample is gel from CaCA with Phosphate added.
Statistically evaluated by ANOVA. Superscripts that are the same within a parameter category indicate no significant difference ($P < 0.05$)

It can be seen from Table 2 that sample hardness, gumminess, springiness and degree of elasticity were effectively unaltered by the addition of starch, whereas the cohesion and chewiness and recoverable energy (RE) of the starch/caseinate gels was significantly reduced while adhesion was significantly increased. In every aspect of the texture profile analysis, starch was ineffective in providing textural modifications that emulate kamaboko.

The degradation that surimi is subject to occurs at freezing temperatures and is the reason that dextrose is added as a preservative. This is the reason that most seafood analogs which form surimi are sweet. The extensive swelling of the starch granules and the relatively large size of the granules in the starches selected may in fact have a disruptive effect on the close matrix that results in casein gelation and lead to the reduction in textural properties. The increase in firmness and elasticity that results from the addition of starch to surimi products was not evident with casein.

EXAMPLE 4

Figure 2:
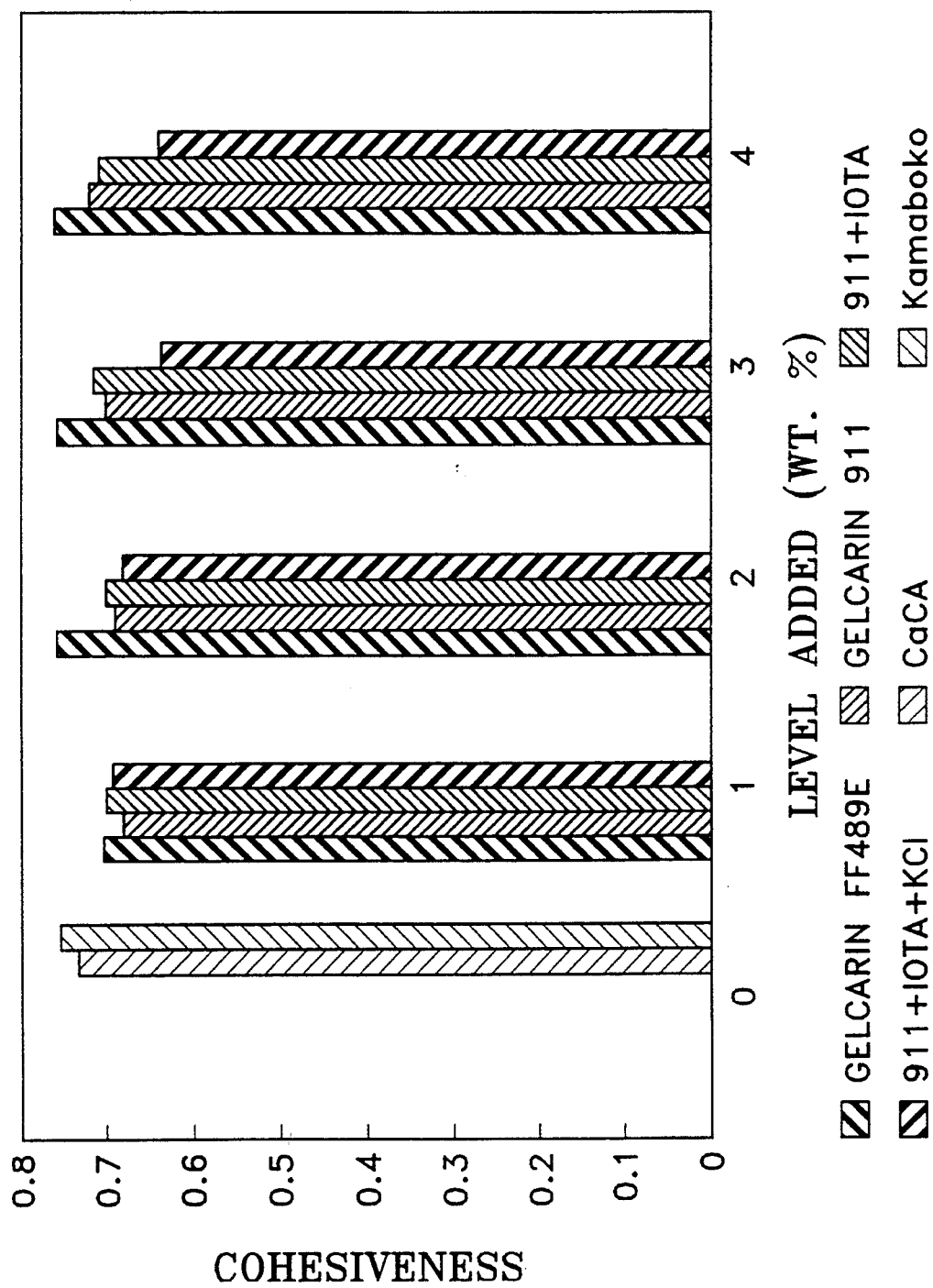
FIG. 2 is a bar graph chart comparing the cohesiveness of various gels with kamaboko.

The textural parameters of the caseinate/carrageenan gels are shown in FIGS. 1 and 2 and Table 3. Data for the control gels and kamaboko gels are also presented for comparative purposes.

showed a significant increase in product cohesiveness and in fact was more cohesive than the kamaboko gel. Cohesiveness for all additives showed no significant difference at the 1% level. The addition of ι-carrageenan to the Gelcarin 911 did not appreciably change the cohesiveness values regardless of the concentration added.

Gumminess, from a sensory standpoint, is defined as the energy required to disintegrate a semisolid food product to a state ready for swallowing. Instrumentally, it is a product of hardness and cohesiveness. Since the cohesiveness values were showing only minor deviations in the gels, the gumminess response was essentially the same as that for hardness. All samples, with the exception of those with added KCl were equal to or greater than both the control and kamaboko gels for this characteristic. Gelcarin FF489E, at the 1% level, most closely emulated kamaboko.

The degree of elasticity accounts for both the rate of recovery of a viscoelastic material as well as the extent of recovery. The elasticity of kamaboko is its most distinctive textural characteristic. Elasticity increased as the concentration of Gelcarin FF489E increased. The most significant improvement in elasticity was achieved at the 3–4% level. The elasticity of the gels with Gelcarin 911, with and without ι-carrageenan was

TABLE 3

| | Texture Parameters of Caseinate Gels. Effect of Carrageenans and KCl | | | | | | | | | | | | | | | |
|---|---|---|---|---|---|---|---|---|---|---|---|---|---|---|---|---|
| | Syneresis Concentration (Wt. %) | | | | Foldability Concentration (Wt. %) | | | | Adhesiveness Concentration (Wt. %) | | | | Recov. Energy Concentration (Wt. %) | | | |
| | 1 | 2 | 3 | 4 | 1 | 2 | 3 | 4 | 1 | 2 | 3 | 4 | 1 | 2 | 3 | 4 |
| CaCA/FF489E | $0.89^a$ | $0.91^a$ | $1.93^c$ | $1.48^c$ | AA | AA | A | A | $0.44^f$ | $0.27^e$ | $0.15^d$ | $0.21^d$ | $0.43^i$ | $0.52^k$ | $0.53^k$ | $0.52^k$ |
| CaCA/911 | $1.46^b$ | $1.36^b$ | $1.20^a$ | $1.26^a$ | AA | A+ | A+ | A | $0.34^e$ | $0.35^e$ | $0.37^f$ | $0.35^e$ | $0.40^i$ | $0.39^i$ | $0.40^i$ | $0.41^i$ |
| CaCA/911/359 | $1.34^b$ | $1.22^a$ | $1.32^{ab}$ | $1.34^{ab}$ | A | A | A | A | $0.29^e$ | $0.28^e$ | $0.21^d$ | $0.46^j$ | $0.42^i$ | $1.44^j$ | $0.45^j$ | |
| CaCA/911/359/KCl | $0.99^a$ | $0.97^a$ | $1.47^b$ | $1.26^a$ | A | A | A | A | $0.19^d$ | $0.21^d$ | $0.19^d$ | $0.16^d$ | $0.41^i$ | $0.41^i$ | $0.35^h$ | $0.33^g$ |
| CaCA | $1.01^a$ | A | $0.18^d$ | $0.48^j$ | | | | | | | | | | | | |
| Kamaboko | $1.99^c$ | AA | $0.10^d$ | $0.66^l$ | | | | | | | | | | | | |

Statistically evaluated by ANOVA. Superscripts that are the same within a parameter category indicate no significant difference ($P < 0.05$)

As seen in FIG. 1, all gels exhibited hardness values that were greater than that for the control and kamaboko gels. The addition of potassium chloride (KCl) had an effect opposite that expected. These gels were less firm and hardness values remained essentially the same regardless of concentration of the κ- and ι-carrageenan additive. Increases in gel hardness with concentration of the κ- and ι-carrageenans were otherwise significant ($P<0.05$). Gels with added FF489E showed increased hardness at 2% concentration and then leveled off. The addition of 1% Gelcarin FF489E most closely emulated the target material.

Cohesiveness is a measure of the material binding properties or strength of the internal bonds. FIG. 2 shows that in all gels, except those with added KCl, cohesiveness values were comparable to the kamaboko samples and showed similar cohesive behavior to the control samples. The addition of 2% Gelcarin FF489E essentially the same regardless of concentration. Gels with ι-carrageenan were more elastic than those with Gelcarin 911 alone. The addition of KCl reduced product elasticity in all cases. None of the gels were as elastic as the kamaboko and only Gelcarin FF489E at a 3–4% added level significantly improved the elasticity compared to the control gel.

The addition of both κ-carrageenans and the κ-ι-carrageenan combination at the 2–3% level were effective in significantly improving the springiness of the gels. These gels were also as springy as kamaboko. KCl addition resulted in gels that showed little or no change in springiness when compared to the control sample.

Chewiness is defined, in sensory terms, as the energy required to masticate a solid food product to a state ready for swallowing, and is the product of gumminess and springiness. The relative differences in the chewiness values are similar to those found for hardness. Because of the improvement in springiness, however, gels with additives at concentrations greater than 1% were significantly chewier than both the control and kamaboko gels. The addition of KCl resulted in a reduction of chewiness at all concentrations.

All of the samples studies showed better water binding characteristics than the kamaboko. Increases in concentration of the carrageenans did however increase syneresis.

Although significant differences were noted in the adhesive forces for the caseinate/carrageenan gels, and were in fact slightly more sticky than the kamaboko, all gels did perform well in this area.

The recoverable energy is a reflection of the gel elasticity. The ability of the caseinate and caseinate/carrageenan gels to retain the energy expended upon compression is significantly less than the target material. The use of Gelcarin FF489E, at the 2% level was effective in significantly increasing recoverable energy.

Figure 3:
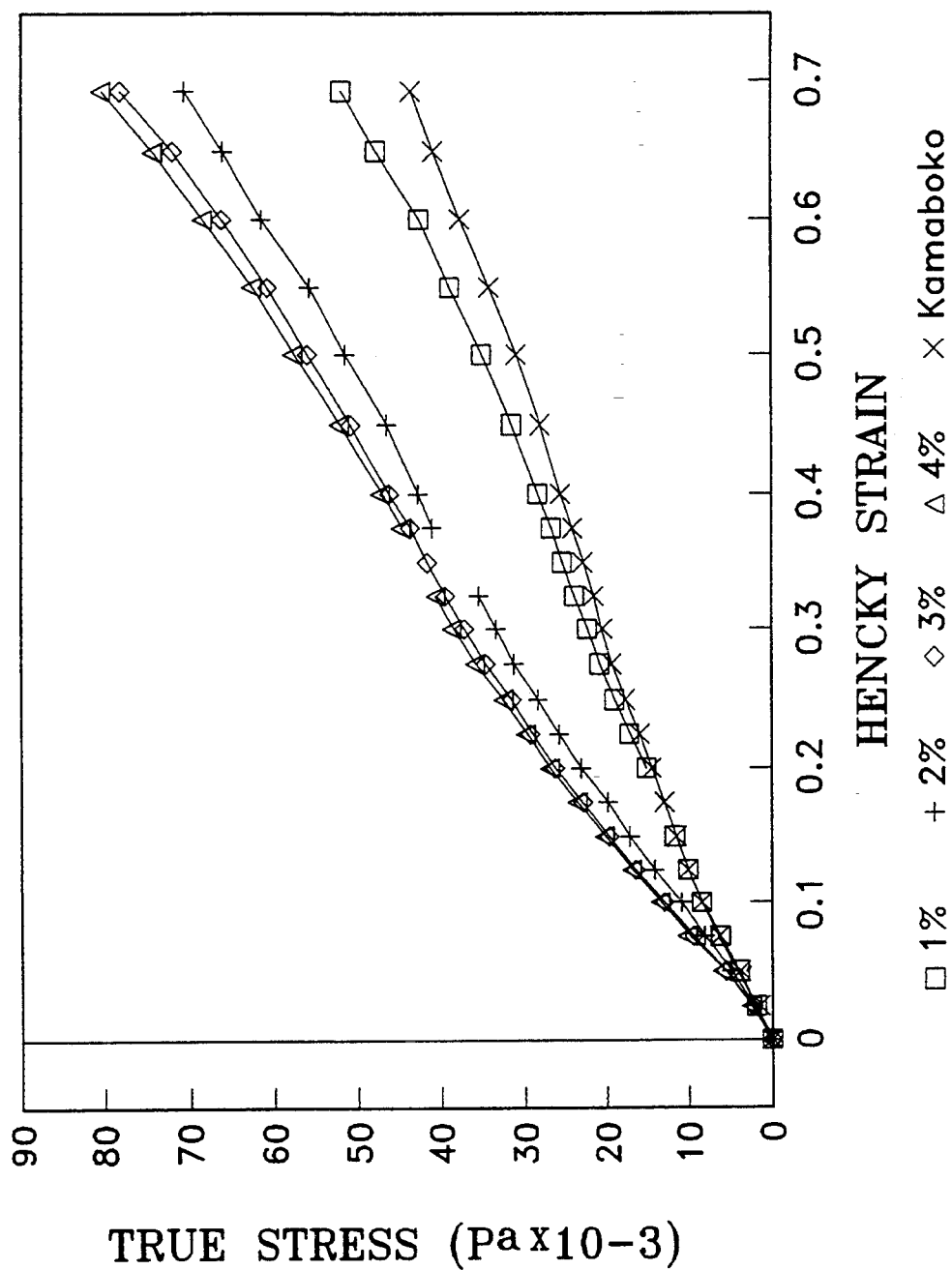
FIG. 3 is a graph comparing the stress strain relationship of CaCN gels with Gelcarin FF489E, at concentrations of 1, 2, 3 and 4 weight percent with kamaboko.

Evaluation of the TPA responses of the gels with added carrageenan indicates that in all areas the Gelcarin FF489E provided the most significant improvement in terms of kamaboko emulation. In FIG. 3 the stress strain relationships for this additive are shown. As can be seen, the 1% Gelcarin FF489E behaves similarly to kamaboko. The deviation of the stress from linearity and the increased sigmoid shape is indicative of the reduced elasticity of the CaCN/FF489E gels and implies that the gels are in fact more compressible (less elastic) than the kamaboko.

What is claimed is:

1. A process for the production of a firm, irreversible protein-containing elastic gel suitable for use as a kamaboko analog or a seafood analog, comprising the steps of:

(A) blending an aqueous mixture consisting essentially of an aqueous component, from about 25% to about 40% by weight of a caseinate, from about 1% to about 10% by weight of sodium hexametaphosphate, and either from about 1% to about 4% by weight of a carrageenan or a combination of lactalbumin in an amount ranging from about 5% to about 15% by weight and egg albumin in an amount ranging from about 5% to about 15% by weight, thereby to form a homogeneous blend;
   (B) heating said blend to form a uniformly viscous solution; and
   (C) cooling to form said gel.

2. The process of claim 1, wherein the aqueous component of the mixture is in the form of ice.

3. The process of claim 1, wherein the gel possesses a water content ranging from about 55% to about 65% by weight.

4. The process of claim 1, wherein the homogeneous blend from step (A) is heated to a temperature of from about 75° C. to about 90° C.

5. The process of claim 4, wherein the blend is heated for a period ranging from about 30 to about 60 minutes.

6. The process of claim 1, wherein the viscous solution is cooled in step (C) to a temperature ranging from about 3° C. to about 5° C.

7. The process of claim 6, wherein the cooling is effected in a mold.

8. The process of claim 1, wherein the gel from step (C) is extruded to form a texturized product for use in seafood analogs.

9. A firm elastic gel produced by the process of claim 1.

10. A kamaboko or seafood analog containing a firm elastic gel produced by the process of claim 1.

* * * * *